T. A. WALKER.
LOCKING GREASE CUP OR LUBRICATOR.
APPLICATION FILED MAY 5, 1911.
1,033,362.
Patented July 23, 1912.
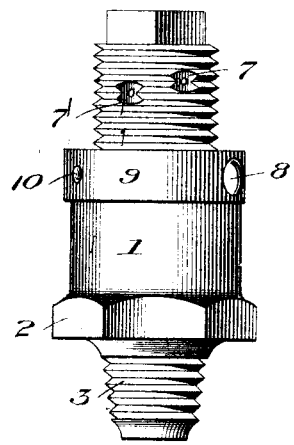
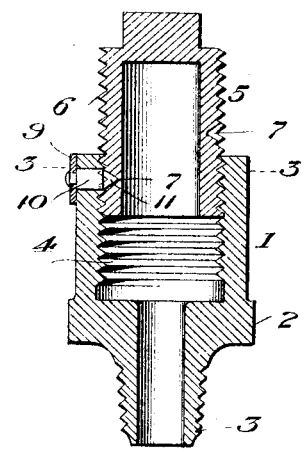
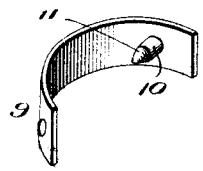
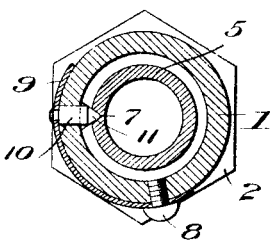
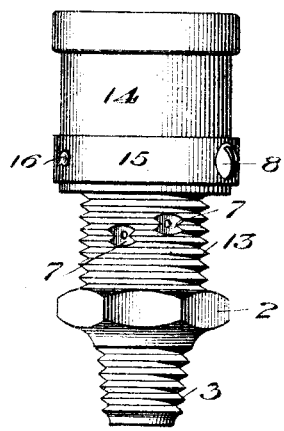
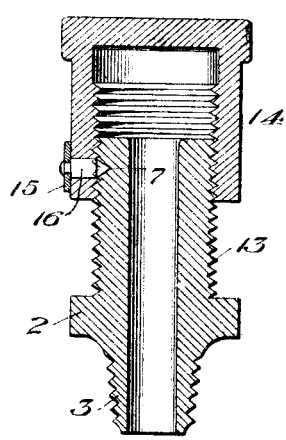
Witnesses
Inventor
Thomas A. Walker
Attorney

UNITED STATES PATENT OFFICE.

THOMAS A. WALKER, OF EVANSVILLE, INDIANA.

LOCKING GREASE-CUP OR LUBRICATOR.

1,033,362.

Specification of Letters Patent. Patented July 23, 1912.

Application filed May 5, 1911. Serial No. 625,156.

*To all whom it may concern:*

Be it known that I, THOMAS A. WALKER, a citizen of the United States, residing at Evansville, county of Vanderburg, and State of Indiana, have invented certain new and useful Improvements in Locking Grease-Cups or Lubricators, of which the following is a specification.

This invention relates to locking grease cups, or lubricators.

My object is the provision of novel means for locking the forcing device of a screw-feed grease cup or lubricator, whether the forcing device be internal or external, and to provide locking means which may be applied to grease cups already in use or to grease cups undergoing manufacture.

With the foregoing objects in view, the invention embodies depressions, preferably of more or less conical form, in the threads of either the stem or the forcing device of the lubricator, arranged at intervals, preferably in general spiral disposition, and an arc-shaped leaf-spring having one part attached to the other member of the lubricating cup, and provided with a locking pin having a preferably conical tip adapted to project through a slot or opening and to engage with any one of the depressions aforesaid and for successive reception in the said depressions as the forcing member of the lubricator is screwed up, to lock or retain said forcing member and insure against its becoming loose through vibration of the machinery on which the lubricator is used, or for other cause, the parts being so arranged that the forcing member may be screwed up to its extreme limit, but will be locked against unscrewing unless the spring is released. Preferably, the spring is of the same curvature as the member of the lubricator to which it is connected and is detachably connected thereto by a screw.

In the accompanying drawings:—Figure 1 is a side elevation; Fig. 2, a vertical section; Fig. 3, a cross section through the locking device; Fig. 4, a detail of the spring and pin; Fig. 5, a side elevation of a modification; and Fig. 6, a vertical section thereof.
The grease cup 1 is provided with the usual nut 2 and screw-stem 3 for its attachment to the journal-box or other place where the cup is to be used, and is internally screw-threaded at 4. The plunger or pressure member 5 is externally screw-threaded at 6 to engage the threads 4 on the grease cup. At suitable intervals the plunger is provided with depressions 7, preferably conical, which may be readily formed by the tip of a twist drill, the depressions being arranged, preferably, in a general spiral form around the plunger and located in the groove between the threads of the screw. Detachably connected to the cup by a screw 8 is an arc-shaped leaf-spring 9 of a curvature approximately that of the exterior of the cup so that it will lie flat thereagainst under normal conditions, this spring being provided near its free end with a pin 10 having a conical tip 11 and adapted to project through an opening 12 in the cup in line with the groove between adjacent screw-threads of the threads 4. As the plunger is screwed into the cup, the tip 11 of the pin travels in the grooves of the threads 6 until a depression 7 is encountered, whereupon it snaps into the depression and locks the plunger in that position against accidental loosening from the vibration of the machinery, or other cause. As the grease or dope is used, the plunger may be screwed up still further for a successive locking.

In Figs. 5 and 6, I have shown the arrangement of the parts reversed. Here the cup is externally screw-threaded at 13 and the plunger assumes the form of a cup 14 which is internally screw-threaded. Instead of the depressions 7 being provided on the plunger, they are provided on the exterior of the stem 13 and the locking spring 15 and pin 16 are carried by the cap-shaped plunger 14.

Having thus described my invention, what I claim as new and desire to secure by Letters Patent, is:—

In a locking grease cup, the combination of a cup and a plunger fitting one within the other and having a screw-threaded connection whereby relative turning feeds the grease or dope, the inner of said members being provided with independent conical depressions whose apices lie in the grooves between the successive crests of its screw-thread, said depressions being arranged in succession in general spiral formation, the outer member having an opening through its side, and an arc-shaped flat leaf-spring detachably connected to the exterior of the member last-named and provided on its free part with a locking pin having a conical tip, said locking pin projecting inwardly through the opening and the conical tip being adapted to travel in the grooves of the thread of the first-named member, to successively snap into the conical depressions thereof.

In testimony whereof, I hereunto affix my signature in presence of two witnesses.

THOMAS A. WALKER.

Witnesses:
W. M. WHEELER,
LELA GEIGER.